(12) United States Patent
Brabenac (10) Patent No.: US 9,183,164 B2
(45) Date of Patent: Nov. 10, 2015

(54) USB HUB WITH AUTOMATIC COMMUNICATION MODE SWITCHING

(75) Inventor: Charles L. Brabenac, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,201

(22) PCT Filed: Mar. 30, 2012

(86) PCT No.: PCT/US2012/031528
§ 371 (c)(1),
(2), (4) Date: Mar. 31, 2014

(87) PCT Pub. No.: WO2013/147860
PCT Pub. Date: Oct. 3, 2013

(65) Prior Publication Data
US 2014/0201399 A1  Jul. 17, 2014

(51) Int. Cl.
G06F 13/12 (2006.01)
G06F 13/38 (2006.01)
G06F 13/10 (2006.01)
G06F 13/40 (2006.01)

(52) U.S. Cl.
CPC ............ G06F 13/10 (2013.01); G06F 13/4022 (2013.01); *G06F 2221/2105* (2013.01)

(58) Field of Classification Search
None
See application file for complete search history.

(56) References Cited

U.S. PATENT DOCUMENTS

| 7,480,753 | B2 | 1/2009 | Bohm et al. | |
|---|---|---|---|---|
| 7,480,758 | B2* | 1/2009 | Lin et al. | 710/316 |
| 7,765,344 | B2 | 7/2010 | Wright | |
| 2006/0179144 | A1 | 8/2006 | Nagase | |
| 2006/0294272 | A1* | 12/2006 | Chou et al. | 710/62 |
| 2007/0175994 | A1* | 8/2007 | Fruhauf | 235/440 |
| 2008/0005262 | A1* | 1/2008 | Wurzburg et al. | 709/217 |
| 2008/0005395 | A1 | 1/2008 | Ong et al. | |
| 2009/0043925 | A1* | 2/2009 | Govindaraman | 710/38 |
| 2010/0095026 | A1* | 4/2010 | Nagai et al. | 710/16 |
| 2013/0128124 | A1* | 5/2013 | Suzuki et al. | 348/723 |
| 2013/0275629 | A1* | 10/2013 | Hall | 710/14 |

OTHER PUBLICATIONS www.usb.org, Requirments and Recommendations for USB Products with Embedded Hosts and/or Multiple Receptacles, Jul. 8, 2014, Revision 1.0, pp. 1-10.*
International Search Report and Written Opinion received for PCT Patent Application No. PCT/US2012/031528, mailed on Nov. 1, 2012, 12 pages.
International Preliminary Report on Patentability and Written Opinion received for PCT Patent Application No. PCT/US2012/031528, mailed on Oct. 9, 2014, 9 pages.

* cited by examiner

*Primary Examiner* — Elias Mamo
(74) *Attorney, Agent, or Firm* — Grossman, Tucker, Perreault & Pfleger, PLLC (57) ABSTRACT

A Universal Serial Bus (USB) hub for allowing communication between a host device and one or more peripheral devices. The USB hub is configured to allow the host device to communicate with the peripheral devices in at least two communication modes and to automatically switch between communication modes in response to the type of connection between the host device and the USB hub. In a first communication mode, the host device is wirelessly coupled to the USB hub and in a second communication mode, the host device is physically coupled (wired-connection) to the USB hub.

14 Claims, 4 Drawing Sheets

USB HUB WITH AUTOMATIC COMMUNICATION MODE SWITCHING

FIELD

The present disclosure relates to Universal Serial Bus (universal serial bus) hubs, and, more particularly, to a USB hub providing automatic switching of communication modes between a host device and one or more peripheral devices coupled to the USB hub.

BACKGROUND

A hubs as generally understood in computing, may allow a client to connect to multiple peripherals. For example, a client device, such as a notebook PC, may be connected to a hub that provides connectivity to other peripherals, such as, for example, a monitor, printer, keyboard, mouse, etc. The hub may include ports to connect the client device and the peripherals thereto, thereby allowing communication between the client device and peripherals. For example, a USB hub may include multiple USB ports for providing connectivity between the client device (e.g. host device) via an upstream port and the peripherals via downstream ports. The client device and peripherals may be physically connected to the associated USB ports of the USB hub by way of USB cables. However, the physical connection of a USB cable from a client device to the USB hub may be inconvenient and may have drawbacks. For example, the client device may be a mobile device, such as a notebook PC, and, as such, a user may wish to disconnect the notebook PC from the USB hub from time to time, especially when traveling. The act of physically disconnecting and reconnecting the client device to the USB hub may become cumbersome and inconvenient.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

To address some of the disadvantages associated with a physical connection of a client device to a USB hub, some USB hubs are configured to allow wireless connectivity thereto. For example, some USB hubs include an upstream port having wireless connectivity, where a client device may wirelessly connect to the upstream USB hub and wirelessly communicate with peripherals coupled to downstream ports of the USB hub.

Although wireless connectivity may provide obvious advantages, in some instances it may be desirable to directly connect (e.g. wire-connection) the client device to the wireless USB hub. For example, the client device may be directly connected to a USB port for the purpose of drawing power from the USB port to charge the client device. In addition, direct connection between the client device and a USB port may provide access to the full bandwidth of the USB port for particular tasks in which greater performance are desirable, such as increased data transmission rates.

The switching of the client device from a wireless connection to a wired connection with some wireless USB hubs may have drawbacks. For example, switching the client device from the wireless connection to a wired connection may result in disruption and/or a complete loss of connection between the client device and any peripherals connected to the USB hub. Additionally, some wireless USB hubs may require a separate complex USB hub and/or USB-switch arrangement in order to redirect peripherals connected to the downstream ports of the USB hub. The transition from the wireless connection to the wired connection may also require a user to manually disconnect the wireless connection between the client device and USB hub and may also require a user to manually switch perphiperals connected to the USB hub to a separate USB hub.

Generally, this disclosure provides a system and method for automatic switching of communication modes between a host device and one or more peripheral devices without causing substantial undue delay and/or disruption of communication between the host and peripheral devices. In particular, a system consistent with the present disclosure includes a Universal Serial Bus (USB) hub having at least one upstream port and one or more downstream ports for allowing communication between the host device and the one or more peripherals. The USB hub is configured to allow the host device to communicate with the one or more peripherals in at least two communication modes. In a first communication mode, the upstream port is configured to provide wireless connectivity between the host device and the USB hub, wherein the USB hub allows the host device to wirelessly communicate with the one or more peripherals. In a second communication mode, the host device is physically coupled (wired-connection) to a downstream port of the USB hub, wherein the USB hub is configured to allow the host device to communication with the one or more peripherals by way of a wired-connection.

The USB hub is configured to monitor the type of connectivity between the host device and the USB hub. The USB hub is further configured to automatically switch from the wireless communication mode to the USB communication mode in response to a determination that the host device has been physically coupled to a downstream port of the USB hub. More specifically, the USB hub is configured to temporarily convert the downstream port into an upstream port and redirect any existing wireless communication between the host device and peripheral devices via a connection established by way of the USB communication mode.

A system consistent with the present disclosure may allow a host device to communicate with one or more peripheral devices in at least two modes of communication while providing automatic switching between the modes of communication without requiring manual input and/or participation from a user in order to switch between communication modes. The system may allow seamless transitioning between communication modes without causing substantial delay and/or disruption of communication between the host device and the peripheral devices.

Figure 1:
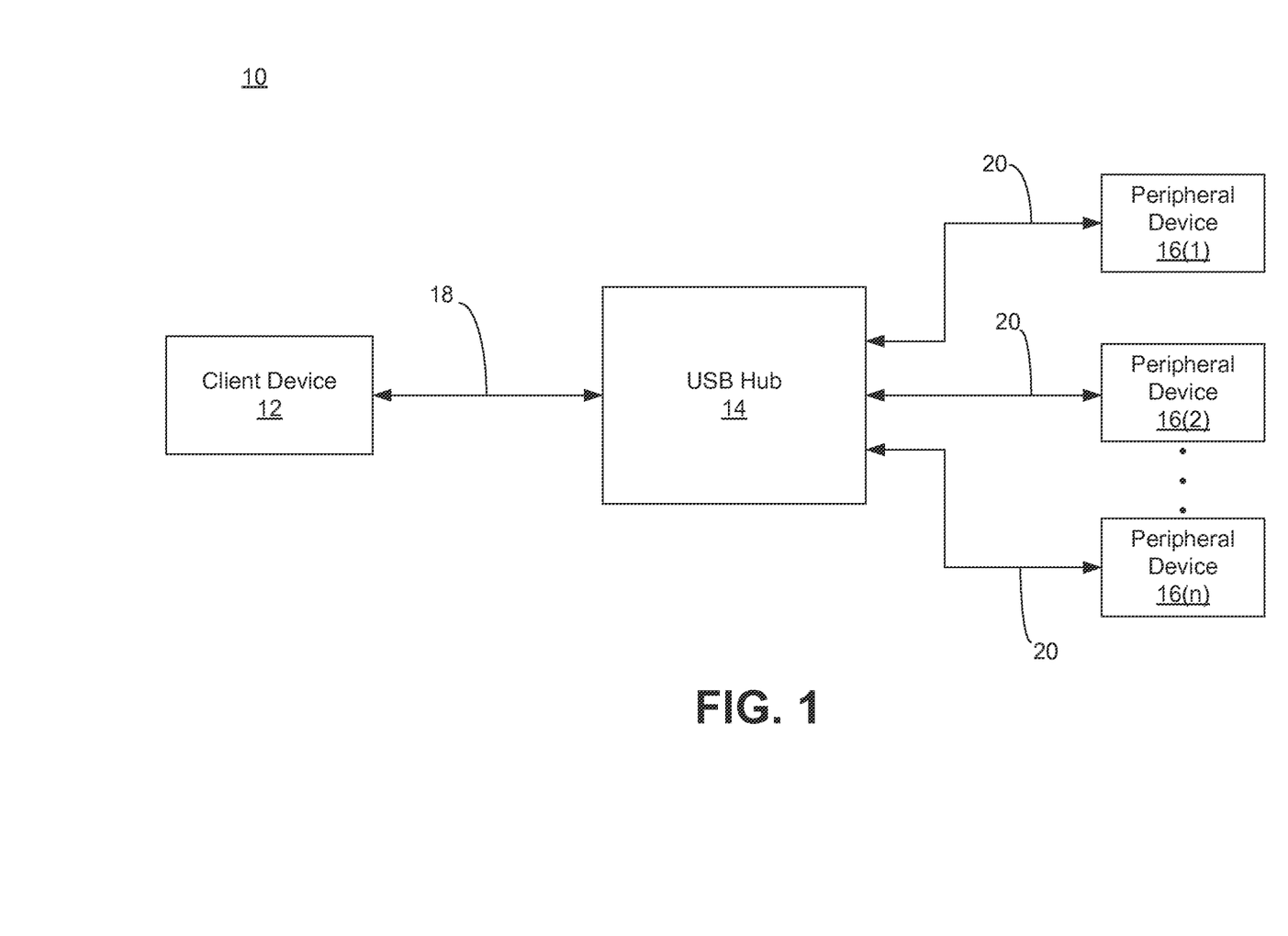
FIG. 1 is a top level diagram of one exemplary embodiment of a system consistent with the present disclosure.

Turning to FIG. 1, one embodiment of a system 10 consistent with the present disclosure is generally illustrated. The system 10 may include a client device 12, a USB hub 14, and one or more peripheral devices client devices 16(1)-16(n)

(hereinafter referred to as "peripheral device 16"). As described in greater detail herein, the USB hub 14 may be configured to allow the client device 12 to communicate with each peripheral device 16.

As shown, the client device 12 may be coupled to the USB hub 14 over a communication link 18. In one embodiment, the client device 12 may be configured to wirelessly communicate with the USB hub 14, and, ultimately, each peripheral device 16, wherein the communication link 16 may include streaming of wireless signals between the client device 12 and USB hub 14. It should be noted that in other embodiments, the client device 12 may be configured to communicate with the USB hub 14 and each peripheral device 16 via a cable (communication link 16 is a wired-connection) having a standard peripheral interface, such as, for example, USB. Similarly, each peripheral device 16 may be coupled to the USB hub 14 over communication links 20. In one embodiment, each peripheral device 16 may be configured to communicate with the USB hub 14 and client device via a cable (communication link 20 is a wired-connection) having a standard peripheral interface, such as, for example, USB. In other embodiments, some of the peripheral devices 16 may be configured to wirelessly communicate with the USB hub 14 and the client device 12.

The client device 12 may include, for example, a personal computer (PC), netbook, tablet, smartphone, and other personal computing devices. The peripheral devices 16(1)-16(n) may include, for example, mouse devices, keyboards, scanners, digital cameras, printers, external storage devices, etc.

Figure 2:
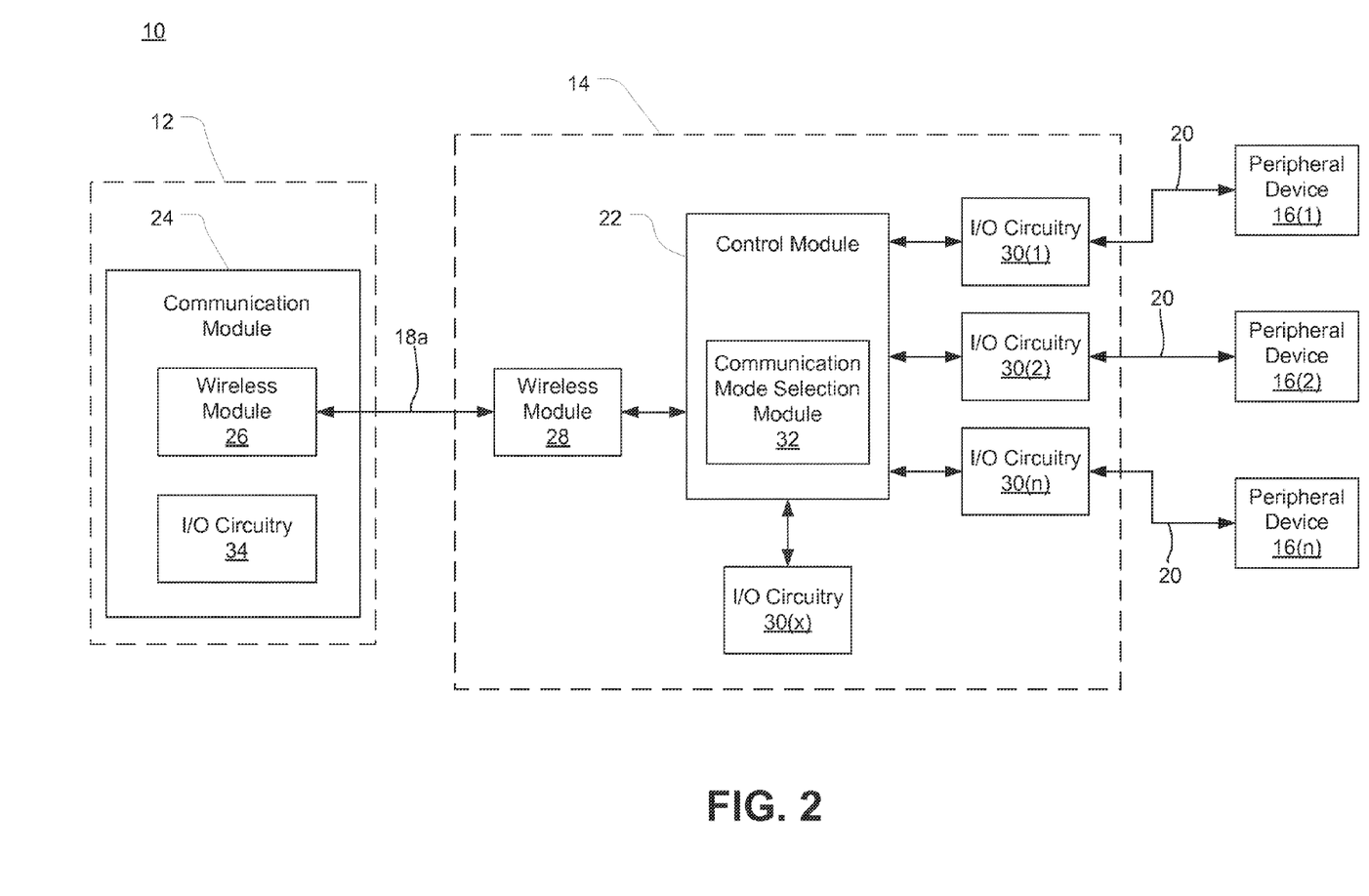
FIGS. 2 and 3 are a block diagrams illustrating the system of FIG. 1 in greater detail.
Figure 3:
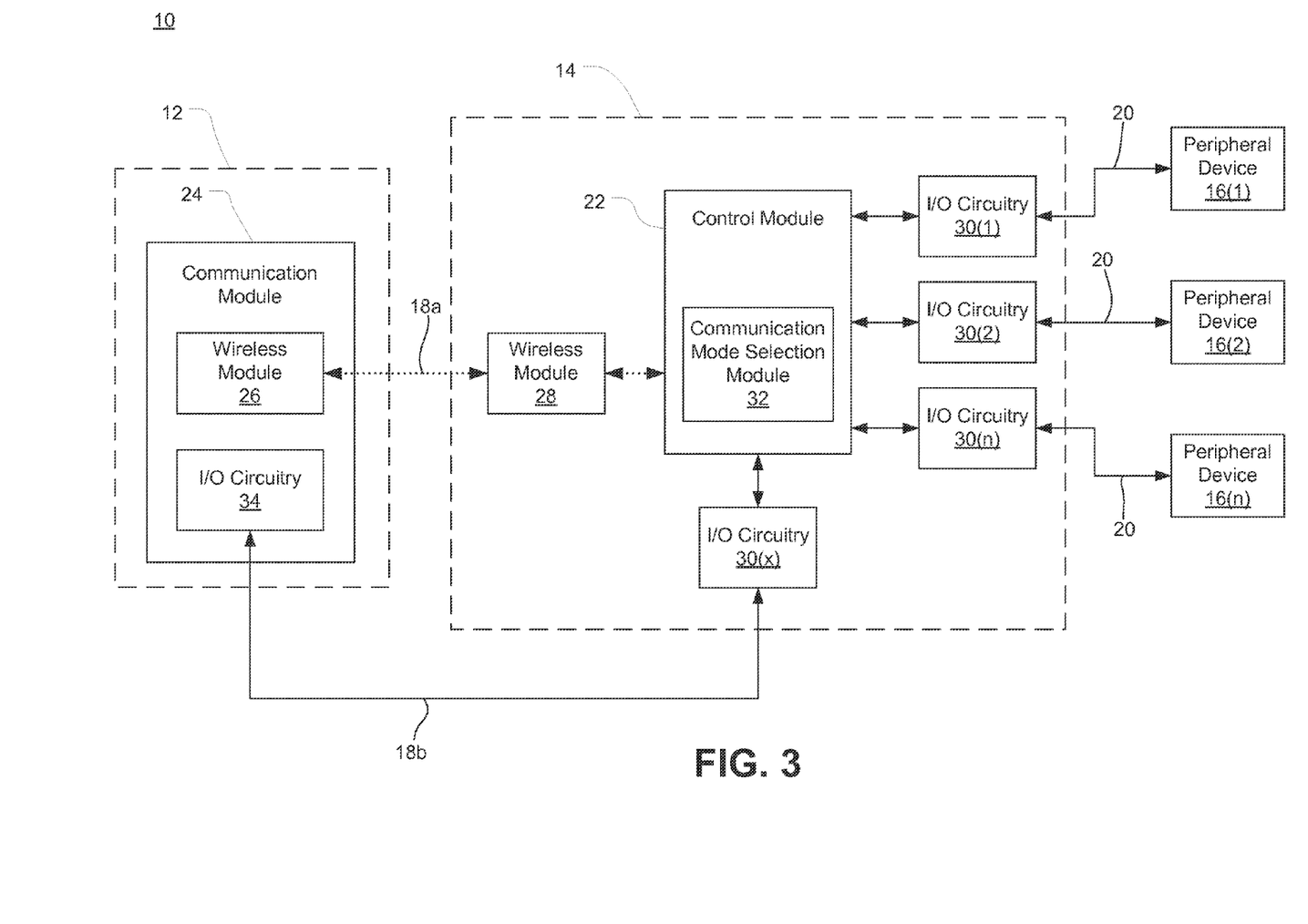

Turning now to FIGS. 2 and 3, the system 10 of FIG. 1 is illustrated in greater detail. In the illustrated embodiment, the USB hub 14 may include a control module 22 configured to allow the client device 12 to communicate with each of the peripheral devices 16(1)-16(n). More specifically, the control module 22 may be configured to execute processings conforming to and in accordance with to any of the existing USB standards and/or future versions and/or derivatives thereof. The control module 22 may further be configured to process transferring data between the client device 12 and one or more peripheral devices 16(1)-16(n) and to selectively switch between modes of communication between the client device 12 and the peripheral devices 16(1)-16(n) described in greater detail herein.

In the illustrated embodiment, the client device 12 may include a communication module 24 configured to allow the client device 12 to communicate with the USB hub 14 and ultimately the peripheral devices 16 via a first communication link 18a. As shown, the communication module 24 may include, for example, a wireless module 26 configured to allow the client device 12 to wirelessly communicate (e.g. transmit and receive signals) with a wireless module 28 of the USB hub 14 via a wireless transmission protocol. In particular, the wireless modules 26, 28 may be WiFi enabled, permitting wireless communication according to one of the most recently published versions of the IEEE 802.11 standards as of March 2012. For example, the wireless modules 26, 28 may permit wireless communication between the client device 12 and the USB hub 14 according to, for example, the most recently published versions of IEEE 802.11ac, IEEE 802.11ad, and/or other 60 GHz standards as of March 2012.

Other wireless network protocols standards could also be used, either in alternative to the identified protocols or in addition to the identified protocol. Other network standards may include Bluetooth, an infrared transmission protocol, or wireless transmission protocols with other specifications. For example, the wireless modules 26, 28 may be configured to allow the client device 12 and USB hub 14 to wirelessly communicate according to one of the most recently published versions of Wireless USB (WUSB), or Certified Wireless USB, standards as of March 2012.

As shown, the USB hub 14 may include I/O circuitry 30(1)-30(n) configured to allow the peripheral devices 16(1)-16(n) to be coupled thereto and to communicate with the USB hub 14 over a wired connection 20. The I/O circuitry 30(1)-30(n) may include USB ports operating in accordance with any of the existing standards and/or future versions and/or derivates thereof. The wireless module 28 of the USB hub 14 may operate as an upstream port for the client device 12 and the I/O circuitry 30(1)-30(n) may operate as downstream ports for the peripheral devices 16(1)-16(n), wherein the control module 22 of the USB hub 14 may be configured to allow data transmission and receipt between the client device 12 and peripheral devices 16(1)-16(n). More specifically, the control module 22 is configured to receive client device data from the upstream wireless module 28 wirelessly coupled to the client device 12 and transmit the client device data to the downstream I/O circuitry 30(1)-30(n) and the peripheral devices 16(1)-16(n) coupled thereto. The control module 22 is further configured to receive peripheral data from the downstream I/O circuitry 30(1)-30(n) coupled to the peripheral devices 16(1)-16(n) and transmit the peripheral data to the upstream wireless module 28 and the client device 12 coupled thereto.

In the illustrated embodiment, the control module 22 may include a communication mode selection module 32 configured to switch the control module 22 between the wireless communication mode and the USB communication mode. More specifically, the communication mode selection module 32 may be configured to communicate with the upstream wireless module 28 and the downstream I/O circuitry 30(1)-30(n) and monitor client device 12 and/or peripheral device 16 connectivity thereto.

When the client device 12 is coupled to the USB hub 14, the communication mode selection module 32 may be configured to identify the type of connection established between the client device 12 and the USB hub 14. For example, if the wireless module 26 of the client device 12 is wirelessly connected to and communicating with the wireless module 28 of the USB hub 14, the communication mode selection module 32 is configured to detect such a connection and determine that the client device 12 is coupled to the USB hub 14 by way of the wireless communication link 18a and associated wireless modules 26, 28. In turn, the communication mode selection module 32 is configured to allow the control module 22 to operate in the wireless communication mode.

As generally illustrated in FIG. 3, the client device 12 may further be configured to communicate with the USB hub 14 and the peripheral devices 16 via a second communication link 18b. As shown, the communication module 24 may include I/O circuitry 34 configured to allow the client device 12 to be coupled to and communicate with I/O circuitry 30(x) of the USB hub 14 over a wired connection 18b. The I/O circuitry 34 may include a USB port operating in accordance with any of the existing standards and/or future versions and/or derivates thereof. As such, the client device 12 may be physically coupled (e.g. wired-connection) to the USB hub 14 by way of a USB cable. The I/O circuitry 30(x) of the USB hub 14 may be configured to operate as a downstream port (having a peripheral role) in a default condition, thereby allowing a peripheral device to be coupled thereto and operating in similar fashion (e.g. standard and/or protocol) as I/O circuitry 30(1)-30(n). The I/O circuitry 30(x) may further be configured to operate as an upstream port (having a host role) when the client device 12 is coupled thereto, described in greater detail herein. In the event that the I/O circuitry 34 of the client device 12 is coupled to the I/O circuitry 30(x) of the USB hub 14, the communication mode selection module 32 is configured to detect such a connection and determine that the client device 12 is coupled to the USB hub 14 by way of the wired communication link 18b and associated I/O circuitry 34, 30(x). In turn, the communication mode selection module 32 is configured to allow the control module 22 to operate in the USB communication mode.

The communication mode selection module 32 may be configured to automatically switch the control module 22 between the wireless communication mode and the USB communication mode in response to the identified type of connection between the client device 12 and the USB hub 14. For example, in one embodiment, the client device 12 may be wirelessly coupled to and communicate with the USB hub 14 by way of the wireless communication link 18a and associated wireless modules 26, 28. Accordingly, the communication mode selection module 32 is configured to monitor client device 12 connectivity to the USB hub 14 and identify that the client device 12 is wirelessly coupled to the USB hub 14. As such, the communication mode selection module 32 is configured to allow the control module 22 to operate in the wireless communication mode, wherein control module 22 is configured to allow the client device 12 to wirelessly communicate with the peripheral devices 16(1)-16(n) by way of the wireless communication link 18a and associated wireless modules 26, 28.

In the event that a user desires to establish a wired-connection between the client device 12 and the USB hub 14 during the wireless communication mode, the client device 12 may be coupled to and communicate with the USB hub 14 by way of the wired communication link 18b. More specifically, the I/O circuitry 34 of the client device 12 may be coupled to the I/O circuitry 30(x) of the USB hub 14 by way of the USB cable 18b, for example. Upon establishing a wired connection between the client device 12 and USB hub 14, the communication mode selection module 32 may detect such connectivity and identify that that the client device 12 is coupled to the USB hub 14 by way of the wired communication link 18b and associated I/O circuitry 34, 30(x). The communication mode selection module 32 is be configured to automatically switch the control module 22 from the wireless communication mode to the USB communication mode in response to the identified wired connection between the client device 12 and USB hub 14. The communication mode selection module 32 is further configured to allow the control module 22 to operate in the USB communication mode, wherein the control module is configured to allow the client device 12 to communicate with the peripheral devices 16(1)-16(n) by way of the wired communication link 18b and associated I/O circuitry 34, 30(x).

As previously described, the I/O circuitry 30(x) of the USB hub 14 may be configured to operate as a downstream port (having a peripheral role) in a default condition, thereby allowing a peripheral device to be coupled thereto and operating in similar fashion (e.g. standard and/or protocol) as I/O circuitry 30(1)-30(n). In the event that the client device 12 is coupled to the USB hub 14 by way of the wired communication link 18b (e.g. the I/O circuitry 34 of the client device 12 is coupled to the I/O circuitry 30(x) of the USB hub 14), the communication mode selection module 32 is configured to temporarily convert the I/O circuitry 30(x) from a downstream state to an upstream state, wherein the role associated with I/O circuitry 30(x) may reverse from a peripheral role (when in a downstream port state) to a host role (when in an upstream port state). As generally understood by one skilled in the art, the I/O circuitry 30(x) may operate in accordance with any of the existing standards and/or future versions and/or derivates thereof that allow role swapping and/or exchange, such as, for example, USB On-The-Go (OTG) Host Negotiation Protocol (HNP).

Upon switching from the wireless communication mode to the USB communication mode, the control module 22 is configured to automatically redirect any existing wireless communication between the client device 12 and the peripheral devices 16 to the wired connection. More specifically, the wireless communication link 18a may be temporarily terminated and any communication (data transmission and receipt) between the client device 12 and peripheral devices 16 occurs via the wired communication link 18b and associated I/O circuitry 34, 30(x). In the event that the user desire to terminate the wired communication link 18b and return to a wireless connection between the client device 12 and USB hub 14, the user may disconnect wire cable from the I/O circuitry 30(x). In one embodiment, the communication mode selection module 32 may be configured to detect that the wired communication link 18b between the client device 12 and USB hub 14 has been terminated and may be configured to automatically switch the control module 22 from the USB communication mode to the wireless communication mode. In turn, the wireless modules 26, 28 may be configured to automatically connect to one another and the wireless communication link 18a may be established between the client device 12 and USB hub 14.

Figure 4:
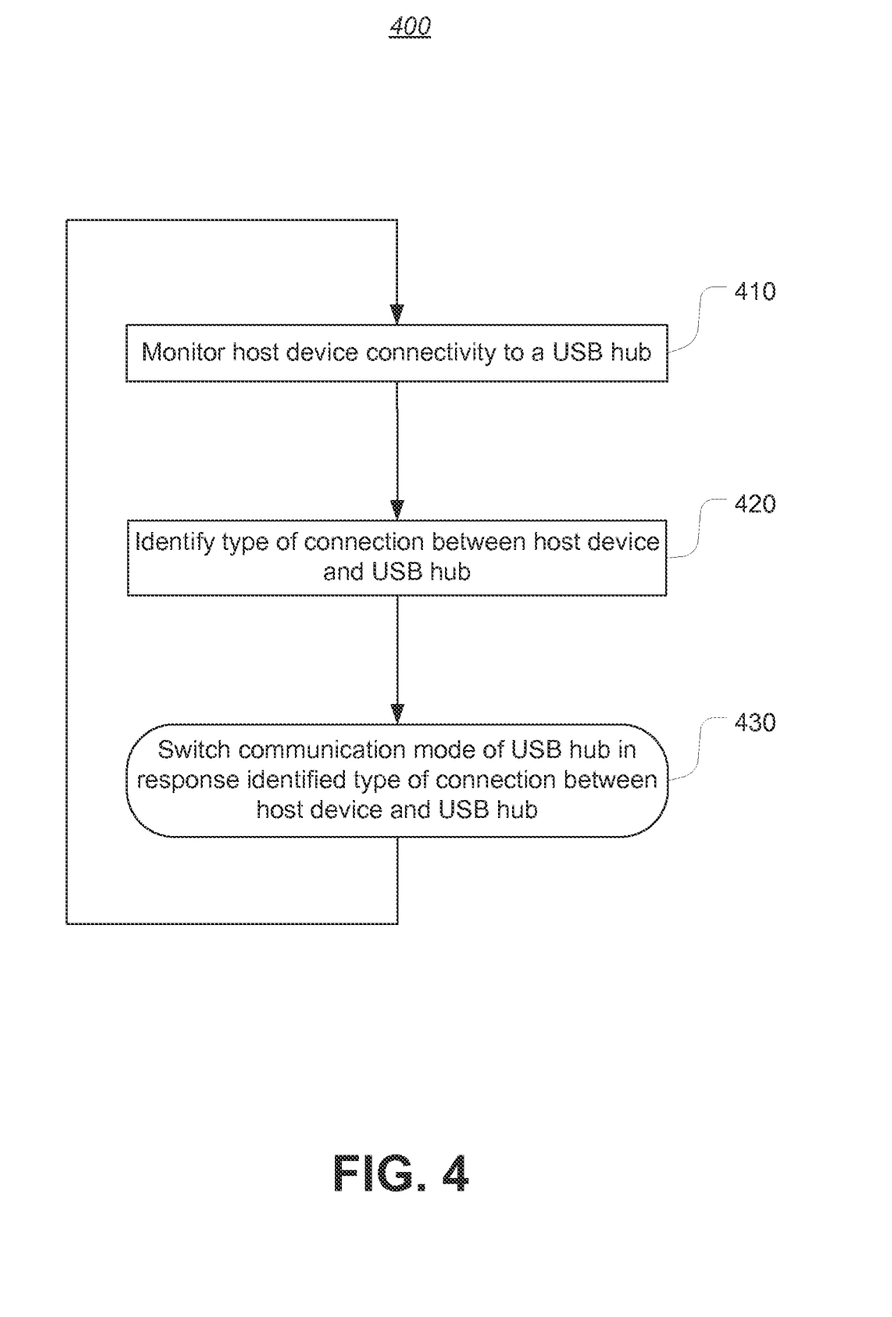
FIG. 4 is a flowchart of operations of one exemplary embodiment consistent with the present disclosure.

Turning now to FIG. 4, a flowchart of operations of exemplary embodiment of a method 400 for communicating between one or more peripheral devices and a host device is illustrated. The method 400 includes monitoring host device connectivity to the USB hub (operation 410). As generally understood, a client device consistent with the present disclosure may act as a host device when coupled to the USB hub. The USB hub may be configured to monitor activity of a host device coupled thereto, including the connectivity of such a device. A USB hub consistent with the present disclosure may provide one or more communication modes allowing the host device to communicate with one or more peripheral devices. For example, the USB hub may be configured to operate in a wireless communication mode, wherein the host device is wirelessly coupled thereto, and a wired communication mode, wherein the host device is coupled to the USB hub by way of a cable. The method 400 further includes identifying, by the USB hub, the type of connection between the host device and the USB hub (operation 420). In one embodiment, the host device may be wirelessly coupled to the USB hub and in another embodiment, the host device may be coupled to the USB hub by way of a wired-connection, such as, for example, a USB interface.

The method 400 further includes switching the communication mode of the USB hub in response to the identified type of connection between the host device and the USB hub (operation 430). Upon the determination of the type of connection between the host device and the USB hub, the USB hub may be configured to switch the mode by which the host device communicates with the peripheral devices. In one embodiment, the host device may be wirelessly coupled to the USB hub and thereby wirelessly communicating with peripheral devices coupled to the USB hub. A user of the host device may choose to physically couple the host device to the USB hub over a wireless connection for a variety of reasons, such as, for example, exploiting a greater amount of bandwidth generally provided by a wired connection in which greater performance is desired, such as increased data transmission rates. Upon identifying a wired connection, the USB hub may be configured to automatically switch between the wireless communication mode and the wired communication mode, thereby allowing the host device to continue to communicate with the peripheral devices without substantial interruption and/or delay.

While FIG. 4 illustrates method operations according various embodiments, it is to be understood that in any embodiment not all of these operations are necessary. Indeed, it is fully contemplated herein that in other embodiments of the present disclosure, the operations depicted in FIG. 4 may be combined in a manner not specifically shown in any of the drawings, but still fully consistent with the present disclosure. Thus, claims directed to features and/or operations that are not exactly shown in one drawing are deemed within the scope and content of the present disclosure.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Consistent with one embodiment of the present disclosure, there is provided a Universal Serial Bus (USB) hub for providing communication between a host device and one or more peripheral devices. The USB hub includes an upstream port configured to communicate with the host device and receive host device data over a communication link and one or more downstream ports configured to communicate with one or more associated peripheral devices and receive peripheral device data over a communication link. The USB hub further includes a control module configured to allow communication between the host device and the one or more peripheral devices in a first communication mode and a second communication mode. The control module is configured to transmit host device data from the upstream port to the one or more downstream ports and the one or more associated peripheral devices coupled thereto and to transmit the peripheral device data from the one or more downstream ports to the upstream port and the host device coupled thereto.

The USB hub further includes a communication mode selection module configured to communicate with the upstream port and the one or more downstream ports and to monitor and identify type of connectivity between the host device and the USB hub. The communication mode selection modules is further configured to automatically switch between the first and second communication modes in response to an identified type of connectivity between the host device and the USB hub.

Consistent with another embodiment of the present disclosure, there is provided a system for providing automatic switching of communication modes between a host device and one or more peripherals devices. The system includes a host device, one or more peripheral devices, and a Universal Serial Bus (USB) hub for providing communication between the host device and the or more peripheral devices. The USB hub includes an upstream port configured to communicate with the host device and receive host device data over a communication link and one or more downstream ports configured to communicate with one or more associated peripheral devices and receive peripheral device data over a communication link. The USB hub further includes a control module configured to allow communication between the host device and the one or more peripheral devices in a first communication mode and a second communication mode. The control module is configured to transmit host device data from the upstream port to the one or more downstream ports and the one or more associated peripheral devices coupled thereto and to transmit the peripheral device data from the one or more downstream ports to the upstream port and the host device coupled thereto.

The USB hub further includes a communication mode selection module configured to communicate with the upstream port and the one or more downstream ports and to monitor and identify type of connectivity between the host device and the USB hub. The communication mode selection modules is further configured to automatically switch between the first and second communication modes in response to an identified type of connectivity between the host device and the USB hub.

Consistent with another embodiment of the present disclosure, there is provided a method for communicating between a host device and one or more peripheral devices. The method includes providing a USB hub having an upstream port configured to communicate with the host device and one or more downstream ports configured to communicate with one or more associated peripheral devices. The USB hub further includes a control module configured to allow communication between the host device and the one or more peripheral devices in a first communication mode and a second communication mode and a communication mode selection module configured to communicate with the upstream port and the one or more downstream ports and switch the control module between the first and second communication modes.

The method further includes monitoring, by the communication mode selection module, host device connectivity to the USB hub and identifying, by the communication mode selection module, the type of connection between the host device and the USB hub. The method further includes switching, by the communication mode selection module, the communication mode of the control module of the USB hub in response to the identified type of connection between the host device and the USB hub.

Consistent with yet another embodiment of the present disclosure, there is provided a computer accessible medium including instructions stored thereon. When executed by one or more processors, the instructions may cause a computer system to perform operations for communicating between a host device and one or more peripheral devices. The operations include providing a USB hub having an upstream port configured to communicate with the host device and one or more downstream ports configured to communicate with one or more associated peripheral devices. The USB hub further includes a control module configured to allow communication between the host device and the one or more peripheral devices in a first communication mode and a second communication mode and a communication mode selection module configured to communicate with the upstream port and the one or more downstream ports and switch the control module between the first and second communication modes.

The operations further include monitoring, by the communication mode selection module, host device connectivity to the USB hub and identifying, by the communication mode selection module, the type of connection between the host device and the USB hub, and switching, by the communication mode selection module, the communication mode of the control module of the USB hub in response to the identified type of connection between the host device and the USB hub.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

As used in any embodiment herein, the term "module" refers to software, firmware and/or circuitry configured to perform the stated operations. The software may be embodied as a software package, code and/or instruction set or instructions, and "circuitry", as used in any embodiment herein, may comprise, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), etc.

Certain embodiments described herein may be provided as a tangible machine-readable medium storing computer-executable instructions that, if executed by the computer, cause the computer to perform the methods and/or operations described herein. The tangible computer-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The computer may include any suitable processing platform, device or system, computing platform, device or system and may be implemented using any suitable combination of hardware and/or software. The instructions may include any suitable type of code and may be implemented using any suitable programming language.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

What is claimed is:

1. A Universal Serial Bus (USB) hub for providing communication between a host device and one or more peripheral devices, said USB hub comprising:
   an upstream port configured to communicate with said host device and receive host device data over a communication link;
   one or more downstream ports configured to communicate with one or more associated peripheral devices and receive peripheral device data over a communication link;
   a control module configured to allow communication between said host device and said one or more peripheral devices in a wireless communication mode and a wired communication mode via said USB hub, said control module being configured to transmit host device data from said upstream port to said one or more downstream ports and said one or more associated peripheral devices coupled thereto and to transmit said peripheral device data from said one or more downstream ports to said upstream port and said host device coupled thereto;

a communication mode selection module configured to:
  communicate with said upstream port and said one or more downstream ports;
  monitor and identify a type of connectivity between said host device and said USB hub; and
  in response to a determination that said host device is physically coupled to a downstream port of said USB hub:
    automatically switch between said wireless communication mode and said wired communication mode without causing substantial disruption of any existing communication between said host device and one or more of said peripheral devices via said USB hub; and
    convert the downstream port to which the host device is physically coupled from a downstream state to an upstream state, thereby reversing a role of said downstream port to which the host device is physically coupled from a peripheral role to a host role.

2. The USB hub of claim 1, wherein each of said one or more downstream ports comprises a wired connection module for allowing said associated peripheral device to communicate with said USB hub via a transmission cable and a wired transmission protocol, wherein said wired transmission protocol is a USB transmission protocol standard as of March 2012.

3. The USB hub of claim 1, wherein said upstream port comprises a wireless communication module for allowing said USB hub to wirelessly communicate with said host device via a wireless transmission protocol.

4. The USB hub of claim 3, wherein said wireless transmission protocol is selected from the group consisting of Bluetooth, infrared, the most recently published versions of Wireless USB (WUSB) or Certified Wireless USB transmission protocol standards as of March 2012, and the most recently published versions of IEEE 802.11 transmission protocol standards as of March 2012.

5. The USB hub of claim 1, wherein when said host device is physically coupled to said USB hub, said upstream port comprises the downstream port that has been converted to an upstream state, and comprises a wired connection module for allowing said host device to communicate with said USB hub via a transmission cable and a wired transmission protocol, wherein said wired transmission protocol is a Universal Serial Bus (USB) transmission protocol standard as of March 2012.

6. The USB hub of claim 5, wherein said wired transmission protocol is USB On-The-Go (OTG) Host Negotiation Protocol (HNP) transmission protocol standard as of March 2012.

7. The USB hub of claim 1, wherein said communication mode selection module is configured to automatically redirect any existing communication between said host device and said one or more peripheral devices when switching between said wired and wireless communication modes.

8. A method for communicating between a host device and one or more peripheral devices, said method comprising:
  providing a USB hub comprising:
    an upstream port configured to communicate with said host device;
    one or more downstream ports configured to communicate with one or more associated peripheral devices;
    a control module configured to allow communication between said host device and said one or more peripheral devices in a wireless communication mode and a wired communication mode via said USB hub; and
    a communication mode selection module configured to:
      communicate with said upstream port and said one or more downstream ports; and
      switch said control module between said wired and wireless communication modes;
  monitoring, by said communication mode selection module, host device connectivity to said USB hub;
  identifying, by said communication mode selection module, a type of connection between said host device and said USB hub;
  in response to a determination that said host device is physically coupled to a downstream port of said USB hub:
    switching from said wireless communication mode to said wired communication mode with said communication mode selection module, without causing substantial disruption of communication between said host device and one or more of said peripheral devices via said USB hub; and
    converting, with said communication mode selection module, the downstream port to which said host device is physically coupled from a downstream state to an upstream state, thereby reversing a role of the downstream port to which the host device is physically coupled from a peripheral role to a host role.

9. The method of claim 8, wherein said upstream port comprises a wireless communication module for allowing said USB hub to wirelessly communicate with said host device via a wireless transmission protocol.

10. The method of claim 9, wherein said wireless transmission protocol is selected from the group consisting of Bluetooth, infrared, the most recently published versions of Wireless USB (WUSB) or Certified Wireless USB transmission protocol standards as of March 2012, and the most recently published versions of IEEE 802.11 transmission protocol standards as of March 2012.

11. The method of claim 8, wherein when said host device is physically coupled to said USB hub, said upstream port comprises the downstream port that has been converted to an upstream state, and comprises a wired connection module for allowing said host device to communicate with said USB hub via a transmission cable and a wired transmission protocol, wherein said wired transmission protocol is a Universal Serial Bus (USB) transmission protocol standard as of March 2012.

12. The method of claim 11, wherein said wired transmission protocol is USB On-The-Go (OTG) Host Negotiation Protocol (HNP) transmission protocol standard as of March 2012.

13. The method of claim 8, further comprising automatically redirecting, by said communication mode selection module, any existing communication between said host device and said one or more peripheral devices when switching between said wireless and wired communication modes.

14. At least one non-transient computer readable medium storing instructions which, when executed by a machine, cause the machine to perform operations comprising:
  providing a USB hub comprising:
    an upstream port configured to communicate with said host device;
    one or more downstream ports configured to communicate with one or more associated peripheral devices;

a control module configured to allow communication between said host device and said one or more peripheral devices in a wireless communication mode and a wired communication mode via said USB hub; and a communication mode selection module configured to:
 communicate with said upstream port and said one or more downstream ports; and
 switch said control module between said wired and wireless communication modes;

monitoring, by said communication mode selection module, host device connectivity to said USB hub;

identifying, by said communication mode selection module, a type of connection between said host device and said USB hub;

in response to a determination that said host device is physically coupled to a downstream port of said USB hub:

switching from said wireless communication mode to said wired communication mode with said communication mode selection module, without causing substantial disruption of communication between said host device and one or more of said peripheral devices via said USB hub; and converting, with said communication mode selection module, the downstream port to which said host device is physically coupled from a downstream state to an upstream state, thereby reversing a role of the downstream port to which the host device is physically coupled from a peripheral role to a host role.

* * * * *